(12) United States Patent
Ghosh et al.

(10) Patent No.: US 9,928,358 B2
(45) Date of Patent: Mar. 27, 2018

(54) METHODS AND SYSTEMS FOR USING TRANSACTION DATA TO AUTHENTICATE A USER OF A COMPUTING DEVICE

(71) Applicant: MasterCard International Incorporated, Purchase, NY (US)

(72) Inventors: Debashis Ghosh, Charlotte, NC (US); Randy Shuken, Westport, CT (US); Mary Elizabeth Lesbirel, San Francisco, CA (US)

(73) Assignee: MasterCard International Incorporated, Purchase, NY (US)

(*) Notice: Subject to any disclaimer, the term of this patent is extended or adjusted under 35 U.S.C. 154(b) by 187 days.

(21) Appl. No.: 14/101,064

(22) Filed: Dec. 9, 2013

(65) Prior Publication Data
US 2015/0161375 A1    Jun. 11, 2015

(51) Int. Cl.
*G06F 21/36* (2013.01)
*G06Q 20/40* (2012.01)

(52) U.S. Cl.
CPC ............. *G06F 21/36* (2013.01); *G06Q 20/40* (2013.01); *G06F 2221/2133* (2013.01)

(58) Field of Classification Search
None
See application file for complete search history.

(56) References Cited

U.S. PATENT DOCUMENTS

| | | | |
|---|---|---|---|
| 4,528,442 A | 7/1985 | Endo | |
| 5,774,525 A | 6/1998 | Kanevsky et al. | |
| 5,946,646 A * | 8/1999 | Schena | H04L 29/06 348/E7.071 |
| 6,263,447 B1 | 7/2001 | French et al. | |
| 7,620,600 B2 | 11/2009 | Patil et al. | |
| 7,707,120 B2 * | 4/2010 | Dominguez | G06Q 20/02 705/30 |
| 7,739,162 B1 * | 6/2010 | Pettay | G06Q 20/04 705/35 |
| 7,979,894 B2 | 7/2011 | Royyuru et al. | |
| 8,016,185 B2 | 9/2011 | Modi | |

(Continued)

OTHER PUBLICATIONS

Datta et al., Imagination: A Robust Image-based CAPTCHA Generation System, © 2005, ACM, 4 pages.*

(Continued)

*Primary Examiner* — Jeffrey Pwu
*Assistant Examiner* — Baotram Tran
(74) *Attorney, Agent, or Firm* — Armstrong Teasdale LLP

(57) ABSTRACT

An authenticating computing device for authenticating a user of a user computing device as a human being. The authenticating computing device comprises a processor configured to receive a request to authenticate a user as human and an identifier associated with at least one of the user and the user computing device. The processor is further configured to retrieve transaction data associated with a payment card account of the user based on the identifier, generate a challenge question based on the transaction data, and generate a plurality of images based on the transaction data. At least one of the plurality of images is a correct image and at least one of the plurality of images is an incorrect image. The processor is further configured to transmit the challenge question and the plurality of images for display on the user computing device.

19 Claims, 8 Drawing Sheets

(56) References Cited

U.S. PATENT DOCUMENTS

| | | | |
|---|---|---|---|
| 8,136,148 B1* | 3/2012 | Chayanam | G06F 21/34 713/183 |
| 8,239,677 B2* | 8/2012 | Colson | G06F 21/34 705/51 |
| 8,533,118 B2 | 9/2013 | Weller et al. | |
| 8,732,089 B1* | 5/2014 | Fang | G06Q 20/40 705/44 |
| 8,904,506 B1* | 12/2014 | Canavor | G06F 17/30 713/182 |
| 8,957,900 B2* | 2/2015 | Lau | G06T 13/00 345/473 |
| 9,323,915 B2* | 4/2016 | Perez | G06F 21/35 |
| 2002/0128977 A1* | 9/2002 | Nambiar | G06F 21/34 705/64 |
| 2003/0061566 A1* | 3/2003 | Rubstein | G06Q 30/02 715/201 |
| 2006/0156385 A1* | 7/2006 | Chiviendacz | G06F 21/36 726/2 |
| 2006/0272007 A1* | 11/2006 | Sweeley | G07C 9/00111 726/2 |
| 2007/0094717 A1* | 4/2007 | Srinivasan | G06F 21/36 726/5 |
| 2007/0192164 A1* | 8/2007 | Nong | G06Q 30/02 715/275 |
| 2008/0040276 A1* | 2/2008 | Hammad | G06Q 20/085 705/44 |
| 2008/0098464 A1* | 4/2008 | Mizrah | G06F 21/36 726/5 |
| 2008/0103972 A1* | 5/2008 | Lanc | G06Q 20/32 705/44 |
| 2008/0120507 A1 | 5/2008 | Shakkarwar | |
| 2008/0134317 A1* | 6/2008 | Boss | G06F 21/31 726/18 |
| 2008/0319896 A1 | 12/2008 | Carlson et al. | |
| 2010/0063895 A1* | 3/2010 | Dominguez | G06Q 20/02 705/26.1 |
| 2010/0070759 A1* | 3/2010 | Leon Cobos | G06F 21/43 713/155 |
| 2010/0114776 A1* | 5/2010 | Weller | G06F 21/31 705/44 |
| 2010/0161470 A1* | 6/2010 | Wiesman | G06F 21/31 705/35 |
| 2011/0026716 A1* | 2/2011 | Tang | G06F 21/43 380/284 |
| 2011/0029902 A1 | 2/2011 | Bailey | |
| 2011/0113237 A1* | 5/2011 | Hird | G06F 21/34 713/155 |
| 2011/0153461 A1* | 6/2011 | Royyuru | G06Q 20/04 705/27.1 |
| 2011/0197070 A1* | 8/2011 | Mizrah | H04L 63/0869 713/176 |
| 2011/0231225 A1 | 9/2011 | Winters | |
| 2011/0239281 A1* | 9/2011 | Sovio | H04L 63/0815 726/5 |
| 2012/0066749 A1* | 3/2012 | Taugbol | G06F 21/35 726/6 |
| 2012/0151567 A1* | 6/2012 | Chayanam | G06F 21/31 726/7 |
| 2012/0214442 A1* | 8/2012 | Crawford | H04W 12/06 455/411 |
| 2012/0216260 A1* | 8/2012 | Crawford | G06F 21/31 726/5 |
| 2013/0036457 A1* | 2/2013 | Vandemar | G06F 21/31 726/4 |
| 2013/0046645 A1* | 2/2013 | Grigg | G06Q 30/06 705/26.1 |
| 2013/0073463 A1* | 3/2013 | Dimmick | G06Q 20/40 705/44 |
| 2013/0104197 A1 | 4/2013 | Nandakumar | |
| 2013/0110658 A1* | 5/2013 | Lyman | G06Q 20/20 705/18 |
| 2013/0160098 A1 | 6/2013 | Carlson et al. | |
| 2013/0185207 A1 | 7/2013 | Lyons et al. | |
| 2013/0218765 A1* | 8/2013 | Hammad | G06Q 20/4016 705/41 |
| 2013/0275308 A1* | 10/2013 | Paraskeva | G06Q 20/32 705/71 |
| 2013/0318580 A1* | 11/2013 | Gudlavenkatasiva | G06F 21/31 726/7 |
| 2014/0137203 A1* | 5/2014 | Castro | H04L 67/02 726/4 |
| 2015/0120549 A1 | 4/2015 | Khalid et al. | |

OTHER PUBLICATIONS

Angeli et al., VIP: a visual approach to user authentication, © 2002, ACM, 8 pages.*

Filyanov et al., Uni-directional Trust Path: Transaction Confirmation on Just One Device, © 2011, IEEE, 12 pages.*

Khusmith et al., Using GSM to Enhance E-Commerce Security, © 2002, ACM, 7 pages.*

Pasupathinathan et al., Formal Analysis of Card-based Payment System in Mobile devices, © 2006, AISW-NetSec, 8 pages.*

Perakslis et al., Social Acceptance of RFID as a Biometric Security Method, © 2005, IEEE, 10 pages.*

Schloglhofer et al., Secure and Usable Authentication on Mobile Devices, © 2012, ACM, 6 pages.*

Verma, icAuth: Image Color Based Authentication System, © 2012, ACM, 2 pages.*

* cited by examiner

METHODS AND SYSTEMS FOR USING TRANSACTION DATA TO AUTHENTICATE A USER OF A COMPUTING DEVICE

BACKGROUND OF THE DISCLOSURE

The field of the disclosure relates generally to a network-based system for authenticating a user of a user computing device, and more specifically to a network based system for using payment transaction data to authenticate the user of a user computing attempting to access a host computing device.

Currently, automated computer systems may access host computing devices associated with service providers to perform fraudulent or otherwise undesirable activities, such as sending spam e-mails, posting advertisements in the comments of websites, utilizing server resources, etc. Accordingly, service providers, such as merchants, banks, and/or government agencies, often need to authenticate a user as a human prior to allowing the user to access certain services and systems offered by the service provider. For example, a bank may require authentication prior to allowing the user to access bank statements and/or transfer funds. However, authentication of a user that is attempting to remotely access the service provider through a computing device can be problematic.

Specifically, known computing systems authenticate users accessing a host computing device through use of a Completely Automated Public Turing test to tell Computers and Humans Apart, also known as a "CAPTCHA." Known CAPTCHA systems generate test inputs that a user of a user computing device is required to input into the device in order to differentiate between human users and computer users. For example, a user may be asked to enter a series of letters and numbers that are shown in an image displayed by the user computing device. In order to prevent automated systems from understanding the displayed image, the letter and number combinations are often heavily italicized, slanted, and/or otherwise distorted. However, in some instances, the letter and number combinations may be distorted to a point that a human user is unable to correctly enter the combination.

In general, current CAPTCHA techniques require the user to perform some task that is not easily replicated or understood by a computer, such as image recognition, speech recognition, or other similar tasks. However, advancements in computer software and hardware continuously require the CAPTCHA to become more difficult for humans and computers alike. Accordingly, improved methods and systems for authenticating that a user is a human are needed.

BRIEF DESCRIPTION OF THE DISCLOSURE

In an aspect a computer-implemented method for authenticating a user of a user computing device as a human being and not an automated machine, wherein the user is attempting to access a host computing device is provided. The method includes receiving, by the authenticating computing device, a request to authenticate the user as human, wherein the authentication request includes an identifier associated with at least one of the user and the user computing device, retrieving transaction data for a payment card account associated with the user based on the identifier, generating a challenge question based on the transaction data associated with the payment card account, generating a plurality of images based on the transaction data, wherein at least one of the plurality of images is a correct image indicative of a correct answer to the challenge question, and at least one of the plurality of images is an incorrect image that is indicative of an incorrect answer to the challenge question, and transmitting the challenge question and the plurality of images for display on the user computing device.

In another aspect, an authenticating computing device for authenticating a user of a user computing device attempting to access a host computing device as a human being and not an automated machine is provided. The authenticating computing device includes a processor configured to receive a request to authenticate a user as human, wherein the authentication request includes an identifier associated with at least one of the user and the user computing device. The processor is further configured to retrieve transaction data for a payment card account associated with the user based on the identifier, generate a challenge question based on the transaction data, and generate a plurality of images based on the transaction data, wherein at least one of the plurality of images is a correct image indicative of a correct answer to the challenge question, and at least one of the plurality of images is an incorrect image that is indicative of an incorrect answer to the challenge question. The processor is further configured to transmit the challenge question and the plurality of images for display on the user computing device.

In yet another aspect, a computer readable medium having computer-executable instructions for authenticating a user of a user computing attempting to access a host computing device as a human being embodied thereon is provided. When executed by at least one processor, the computer-executable instructions cause the at least one processor to receive a request to authenticate a user as human, wherein the authentication request includes an identifier associated with at least one of the user and the user computing device, retrieve transaction data for a payment card account associated with the user based on the identifier, generate a challenge question based on the transaction data, and generate a plurality of images based on the transaction data, wherein at least one of the plurality of images is a correct image indicative of a correct answer to the challenge question and at least one of the plurality of images is an incorrect image that is indicative of an incorrect answer to the challenge question, and transmit the challenge question and the plurality of images for display on the user computing device.

BRIEF DESCRIPTION OF THE DRAWINGS

FIG. 1 is a schematic diagram illustrating an exemplary multi-party transaction card industry system for enabling payment-by-card transactions in which merchants and card issuers do not need to have a one-to-one special relationship FIG. 2 is a simplified block diagram of an example authenticating environment for use in authenticating a user of a user computing device as a human being and not an automated machine, wherein the user is attempting to access a host computing device.

FIG. 3 is an expanded block diagram of the authenticating environment shown in FIG. 2 with a server architecture.

FIG. 4 illustrates an example configuration of a client computing device as shown in FIGS. 2 and 3.

FIG. 5 illustrates an example configuration of a server system as shown in FIGS. 2 and 3 coupled to an authenticating computing device.

FIG. 6 is a simplified flowchart illustrating an example process implemented by an authenticating computing device shown in FIGS. 2 and 3 for using transaction data to authenticate a user as human and not an automated machine.

FIG. 7 is an example user interface of the user computing device shown in FIG. 2 displaying an example challenge question generated by the authenticating computing device as shown in FIGS. 2 and 3.

FIG. 8 is a diagram of a component layout of an authenticating computing device as shown in FIGS. 2 and 3.

DETAILED DESCRIPTION OF THE DISCLOSURE

Figure 1:
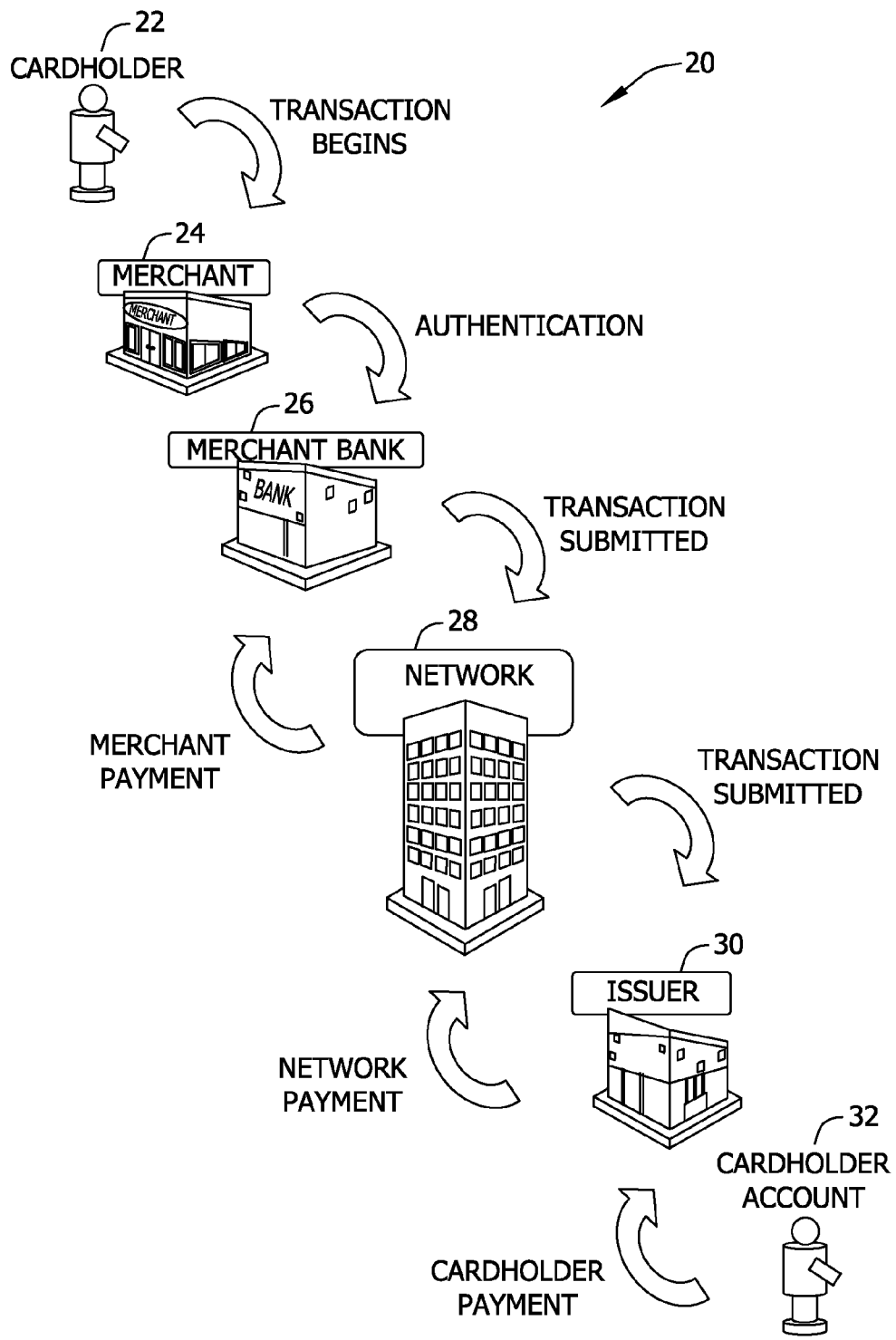
FIGS. 1-8 show example embodiments of the method and system described herein.

Embodiments of the present disclosure describe an authenticating environment that uses transaction data processed by a payment network to authenticate a user as a human being and not an automated machine, wherein the user is using a user computing device to attempt to access a host computing device. The authenticating environment includes an authenticating computing device that is configured to associate at least one of the user and the user computing device with a particular payment card account used in performing payment transactions. The authenticating computing device is also configured to determine whether the user of a user computing device that is attempting to access a host computing device is a human being. The determination is based on testing the user's knowledge of payment transactions associated with the particular payment card account. For example, the authenticating environment may authenticate the user based on determining whether the user knows at which restaurant a payment transaction associated with the payment card account was performed within the last week. In the example embodiment, the user is a cardholder that performs payment transactions associated with the payment card account, and the authenticating computing device receives a user identifier that identifies the user as the cardholder. Alternatively, the user computing device may be associated with the particular payment card account, for example via pre-registration, and the authenticating computing device associates the user with a particular payment card account based on a computer identifier.

More specifically, in the example embodiment, a cardholder associated with a payment card account initiates payment transactions with a plurality of merchants, for example to buy a product. The merchants are in communication with a payment network that processes each of the payment transactions, and stores transaction data associated with each of the payment transactions in a memory. The transaction data may include, for example, cardholder data that identifies the cardholder and/or payment card account associated with the payment transaction, merchant data that identifies the particular merchant associated with the payment transaction, product data that identifies the product purchased by the user, timestamp data that identifies when the payment transaction occurred, purchase amount data that identifies the amount of funds transferred in the payment transaction, and/or any other type of data associated with the payment transactions.

Further, in the example embodiment, a user of a user computing device requests access to a host computing device that hosts secure data and/or provides a secure service. The host computing device may be associated with a service provider, for example, a merchant, a bank, a government agency, and/or any other entity that hosts secure data, services, or any other data that the host does not want accessed by an automated machine. The host computing device receives the request, and communicates with the authenticating computing device to authenticate the user as human and not as an automated machine. As described herein the term "automated machine" means any electrical or mechanical device configured to repeatedly and automatically perform a series of tasks. For example, an automated machine may be the user computing device running a scripted computer program that attempts to access secure data or information from the host computing device.

The authenticating computing device receives the authentication request from the host computing device and associates the user the user with a particular payment card account based on an identifier associated with the request. In one implementation, the authenticating computing device determines the payment card account associated with the user by comparing a computer identifier, such as a media access control (MAC) address and/or internet protocol (IP) address of the user computing device, with predefined computer identifiers associated with particular payment card accounts. For example, the user may pre-register the user computing device with their payment card account. In another implementation, the authenticating computing device determines the payment card account associated with the request based on a user identifier, for example, a username, PAN, and/or other information entered by the user.

In the example embodiment, the authenticating computing device retrieves transaction data associated with the identified payment card account, and generates a challenge question based on the stored transaction data. For example, the authenticating computing device may generate a challenge question that asks "which restaurant did you frequent and perform a payment transaction with last night?" based on transaction data indicating a payment transaction having been processed for a particular restaurant the previous evening. The authenticating computing device may also generate a plurality of images associated with the challenge question, including at least one correct image and at least one incorrect image. The correct image represents the correct answer to the challenge question. Given the example challenge question above, the correct image would identify the particular restaurant at which the payment transaction occurred. The correct image may be the trademark, logo, brand name, image of the physical product or merchant purchased, or any other image that represents the correct answer. The at least one incorrect image does not identify the correct answer to the challenge question. For example, the at least one incorrect image may be a different restaurant or may not be a restaurant at all. In some embodiments, the authenticating computing device further generates descriptive text for each of the plurality of images. In such an embodiment, the descriptive text may describe the content of the image.

Further, in the example embodiment, the challenge question and the plurality of images are transmitted to the user for display on the user computing device. The challenge question and the plurality of images may be transmitted directly to the user computing device from the authentication computing device. Alternatively, the challenge question and the plurality of images may be transmitted to the user computing device through the host computing device. The user answers the at least one challenge question, for example, by selecting one of the plurality of images, and transmitting the selection to the authenticating computing device. The authenticating computing device authenticates the user when the received image selection matches the correct image. In some implementations, the authenticating computing device may provide a plurality of challenge questions to the user, and authenticate the user based on receiving the correct image for each of the plurality of challenge questions.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, systems and methods for using transaction data to authenticate a user of a user computing device as a human being and not an automated machine, wherein the user is attempting to access a host computing device. However, it is contemplated that this disclosure has general application to using transaction data in authenticating the user of a user computing device.

As used herein, an element or step recited in the singular and preceded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a schematic diagram illustrating an example multi-party transaction system 20 for enabling ordinary payment transactions in which merchants 24 and card issuers 30 do not need to have a one-to-one special relationship. Embodiments described herein may relate to a transaction system, such as the payment network operated by MasterCard International Incorporated, the assignee of the present disclosure. Such a network is comprised, in part, of a set of proprietary communications standards and protocols for the exchange of financial transaction data and the settlement of funds between financial institutions that are members of the payment network.

In a typical payment system, a financial institution called the "issuer" 30 issues a payment card associated with a payment card account, such as a credit card, debit card, electronic check, prepaid card, paper check, mobile phone with access to the payment card account, or any other form of payment, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale (POS) terminal, which reads cardholder's 22 account information from a magnetic stripe, a chip, embossed characters, or other device on the payment card that may be manually inputted into the POS terminal, and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment network 28, computers of merchant bank 26 or merchant processor will communicate with computers of an issuer bank 30 to determine whether the payment transaction should be authorized. This may include a number of factors such as, whether cardholder's 22 account 32 is in good standing, and whether the purchase is covered by user's 22 available credit line. If the request is accepted, an authorization code is issued to merchant 24.

When a request for authorization is accepted, the available credit line of cardholder's 22 payment card account 32 is decreased. In some cases, a charge for a payment transaction may not be posted, i.e., "captured" immediately to cardholder's 22 payment card account 32, whereas in other cases, especially with respect to at least some debit card transactions, a charge may be posted or captured at the time of the transaction. In some cases, when merchant 24 ships or delivers the goods or services, merchant 24 captures the transaction by, for example, appropriate data entry procedures on the POS terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment network 28 and/or issuer bank 30 stores the payment card information, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When payment network 28 receives the itinerary information, payment network 28 routes the itinerary information to database 120 (shown in FIG. 2).

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment network 28, and then between payment network 28 and merchant bank 26, and then between merchant bank 26 and merchant 24.

Figure 2:
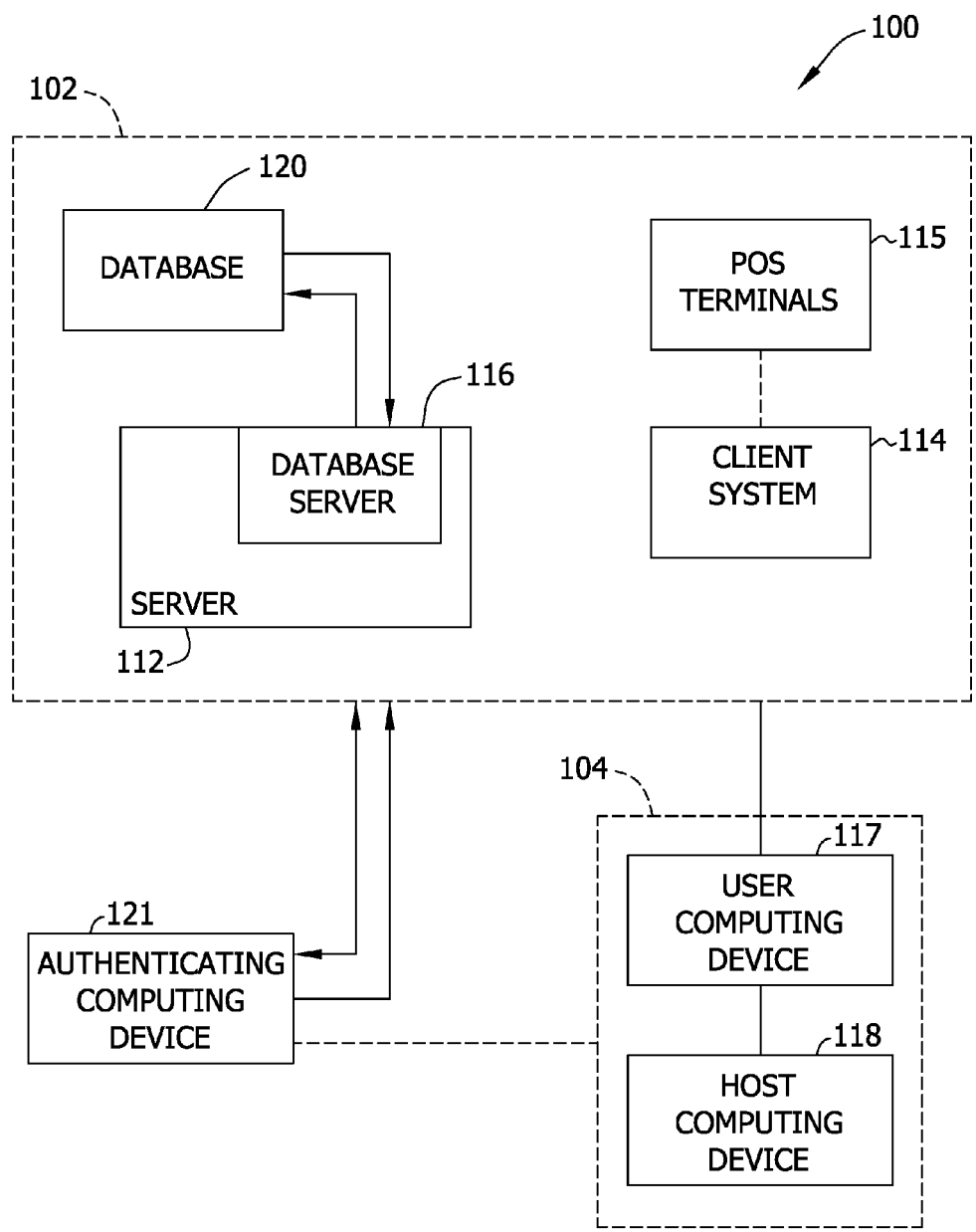

FIG. 2 is a simplified block diagram of an example authenticating environment 100 for use in authenticating a user of a user computing as a human being and not an automated machine. The user is attempting to access secure data stored on a host computing device. Authenticating environment 100 includes a plurality of systems and computing devices, such as a payment sub-system 102, a services sub-system 104, and an authenticating computing device 121. Payment sub-system 102 includes a plurality of computer devices such as server system 112, client systems 114, POS terminals 115, and database 120. Payment sub-system 102 processes payment transactions between a cardholder and a plurality of merchants, and generates transaction data based on those payment transactions. Services sub-system 104 includes a user computing device 117 and a host computing device 118, the host computing device 118 stores secure data and/or provides services that are accessed by the user computing device 117. Services sub-system 104 communicates with authenticating computing device 121 to manage communications between user computing device 117 and host computing device 118. For example, authenticating computing device 121 may offer authentication services to services sub-system 104 in order to manage communication between user computing device 117 and host computing device 118. Specifically, authenticating computing device 121 implements a process that uses transaction data stored by payment sub-system 102 to authenticate a user as a human being, and enabling the user computing device 117 to access secure data from host computing device 118.

In the example embodiment, payment sub-system 102 includes server system 112, and a plurality of client systems 114 connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment sub-system 102 also includes point-of-sale (POS) terminals 115, which may be connected to client systems 114, and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's payment card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network, including data relating to merchants, account holders or customers, issuers, acquirers, and/or purchases made. For example, database 120 stores transaction data including at least one of timestamp data indicative of a time a payment transaction occurred, purchase data indicative of a product, i.e., a good or service, that has been purchased and/or leased, purchase amount data indicative of an amount of funds transferred as part of the payment transaction, merchant data including a merchant identifier that identifies the merchant and/or merchant location associated with the payment transaction, and/or cardholder data including at least one of a cardholder name, a cardholder address, a PAN, and any other account identifying information. Database 120 may store the merchant identifier in a list that identifies each merchant registered to use the network, and instructions for settling transactions including merchant bank account information.

Services sub-system 104 includes user computing device 117 and host computing device 118. Host computing device 118 is configured to communicate with at least one of server system 112, client systems 114, and user computing device 117. In the exemplary embodiment, host computing device 118 is associated with or controlled by a service provider for securely storing data and providing secure services to users. For example, host computing device 118 may host a banking service that is accessed by users using user computing devices 117 to access financial data. To enhance security, host computing device 118 may allow only authenticated users to access the secure financial data and/or services. Host computing device 118 is interconnected to the Internet through many interfaces including a network, such as a local area network (LAN) or a wide area network (WAN), dial-in-connections, cable modems, wireless modems, and special high-speed ISDN lines. Host computing device 118 could be any device capable of interconnecting to the Internet including a web-based phone, personal digital assistant (PDA), or other web-based connectable equipment. In one embodiment, host computing device 118 is configured to communicate with client system 114 and/or user computing device 117 using various outputs including, for example, Bluetooth communication, radio frequency communication, near field communication, network-based communication, and the like. More specifically, in one embodiment, host computing device 118 communicates with user computing device 117 through a website associated with the service provider.

Authenticating environment 100 also includes an authenticating computing device 121 that is in communication with payment sub-system 102 and/or services sub-system 104. Authenticating computing device 121 may be a stand-alone computing device that includes a processor and a memory and is configured to communicate with server system 112, client system 114, user computing device 117, host computing device 118, and/or database 120. Alternatively, authenticating computing device 121 may be integrated with server system 112. Authenticating computing device 121 provides services that enable host computing device 118 to authenticate the identity of a user. More specifically, authenticating computing device 121 leverages transaction data stored in database 120 to generate a challenge question and at least one correct answer related to a payment transaction initiated by an cardholder. Authenticating computing device 121 provides the challenge question to the user through user computing device 117, and receives an answer from the user. Authenticating computing device 121 authenticates that the user is the cardholder when the received answer is the correct answer.

In the example embodiment, server system 112 may be associated with a payment network. One of client systems 114 may be associated with an acquirer bank, and/or a merchant while another one of client systems 114 may be associated with an issuer, and/or an cardholder. POS terminal 115 may be associated with a merchant with whom payment transactions are performed. User computing device 117 is associated with a user attempting to access host computing device 118, and host computing device 118 may be associated with a service provider that hosts secure data.

Figure 3:
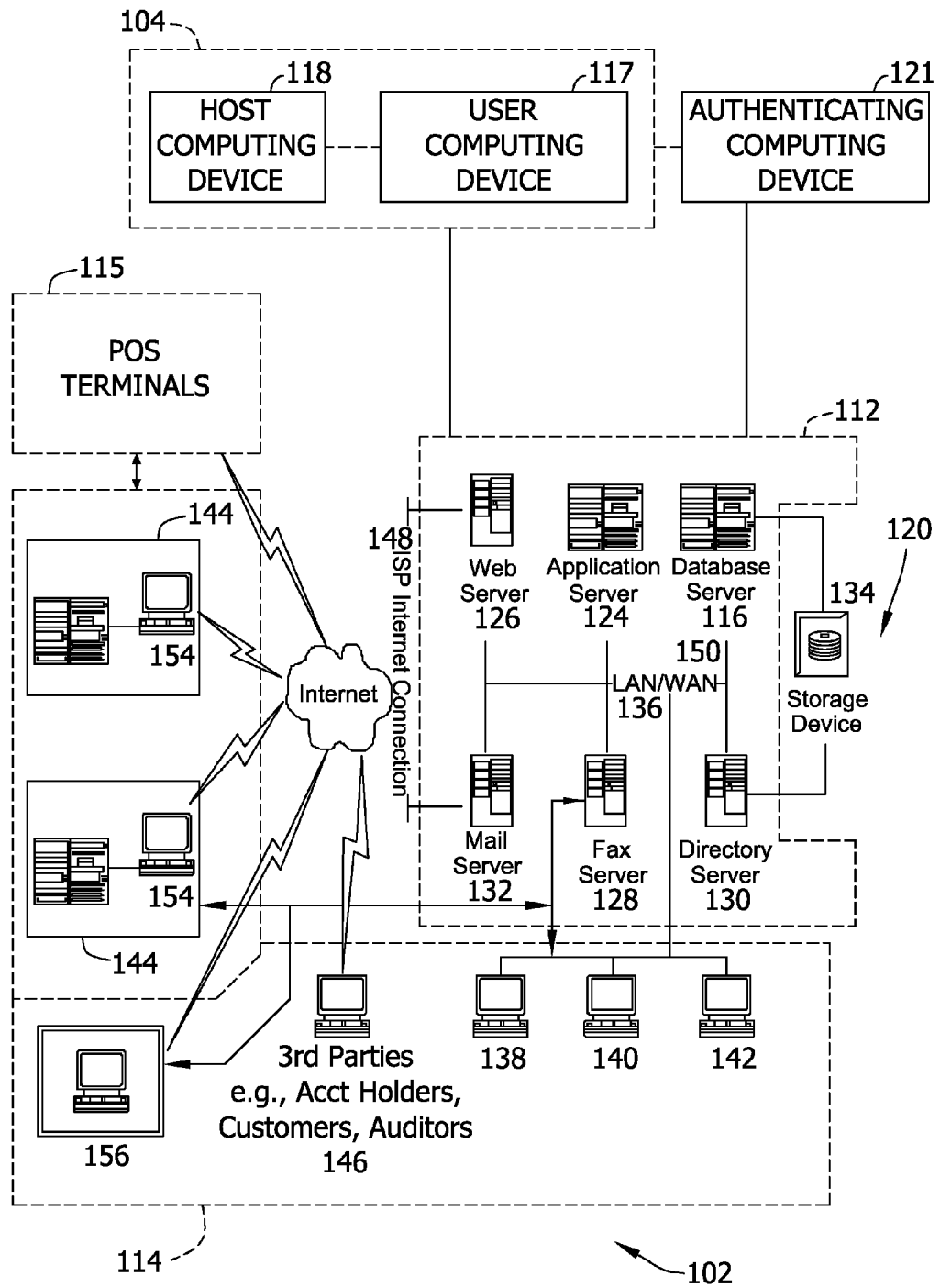

FIG. 3 is an expanded block diagram of an example server architecture of authenticating environment 100 including other computer devices in accordance with one embodiment of the present disclosure. Authenticating environment 100 includes payment sub-system 102, which includes server system 112, client systems 114, and POS terminals 115. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet and a WAN type communication, however, any other type communication can be utilized in other embodiments, i.e., the systems and processes are not limited to being practiced using the Internet. In addition, rather than WAN 150, LAN 136 could be used.

In the example embodiment, any authorized individual having a workstation 154 can access processing system 122. At least one of the client systems 114 includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Authenticating environment 100 also includes services sub-system 104, which includes candidate user computing device 117 and host computing device 118. User computing device 117 and host computing device 118 may communicate internally, with payment network 102, and/or with authenticating computing device 121 through any suitable network communication method including, but not limited to, WAN 150 type communications, LAN 136 type communications, 3G type communications, or WIMAX type communications.

Authenticating computing device 121 may communicate with payment sub-system 102 and services sub-system 104 through any suitable network communication method including, but not limited to, Wide Area Network (WAN) 150 type communications, LAN 136 type communications, 3G type communications, or Worldwide Interoperability for Microwave Access (WIMAX) type communications.

Figure 4:
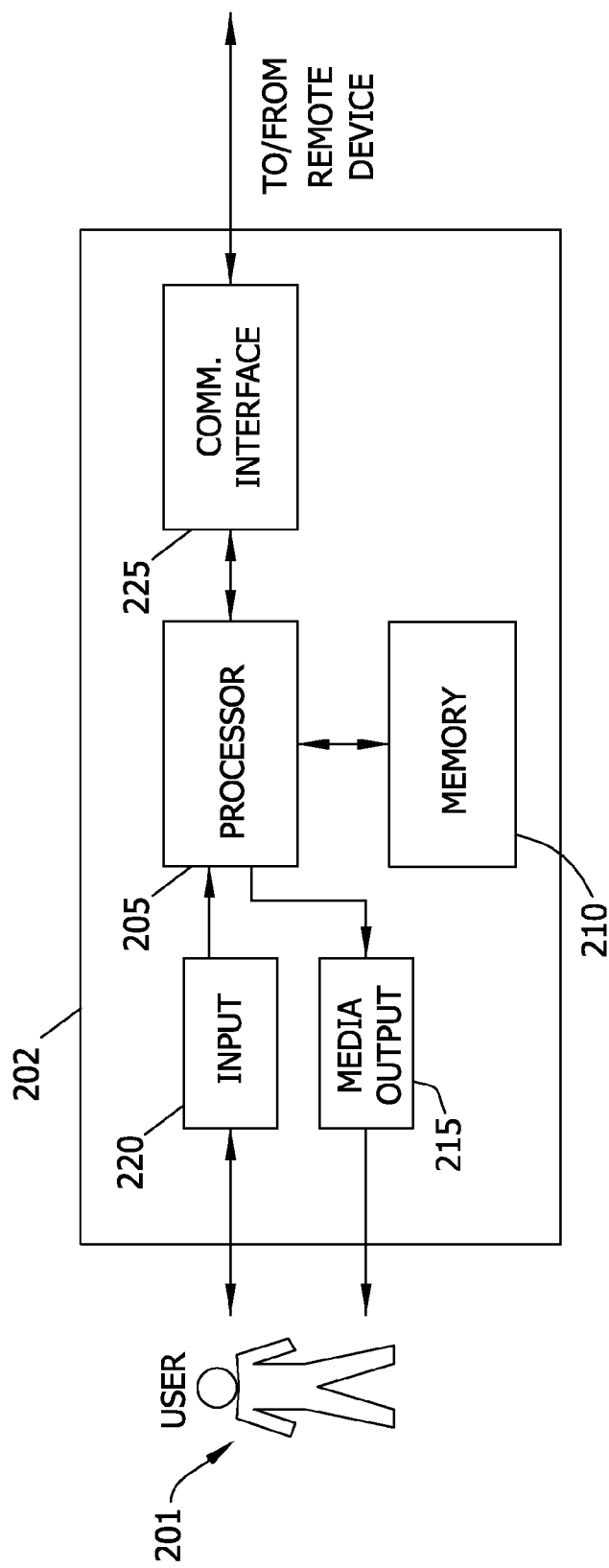

FIG. 4 illustrates an example configuration of a user system 202 operated by a user 201, such as the user of user computing device 117. User system 202 may include, but is not limited to, client systems 114, 138, 140, and 142, POS terminal 115, user computing device 117, host computing device 118, authenticating computing device 121, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information, such as executable instructions and/or written works, to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, such as a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, and/or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network such as WIMAX.

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
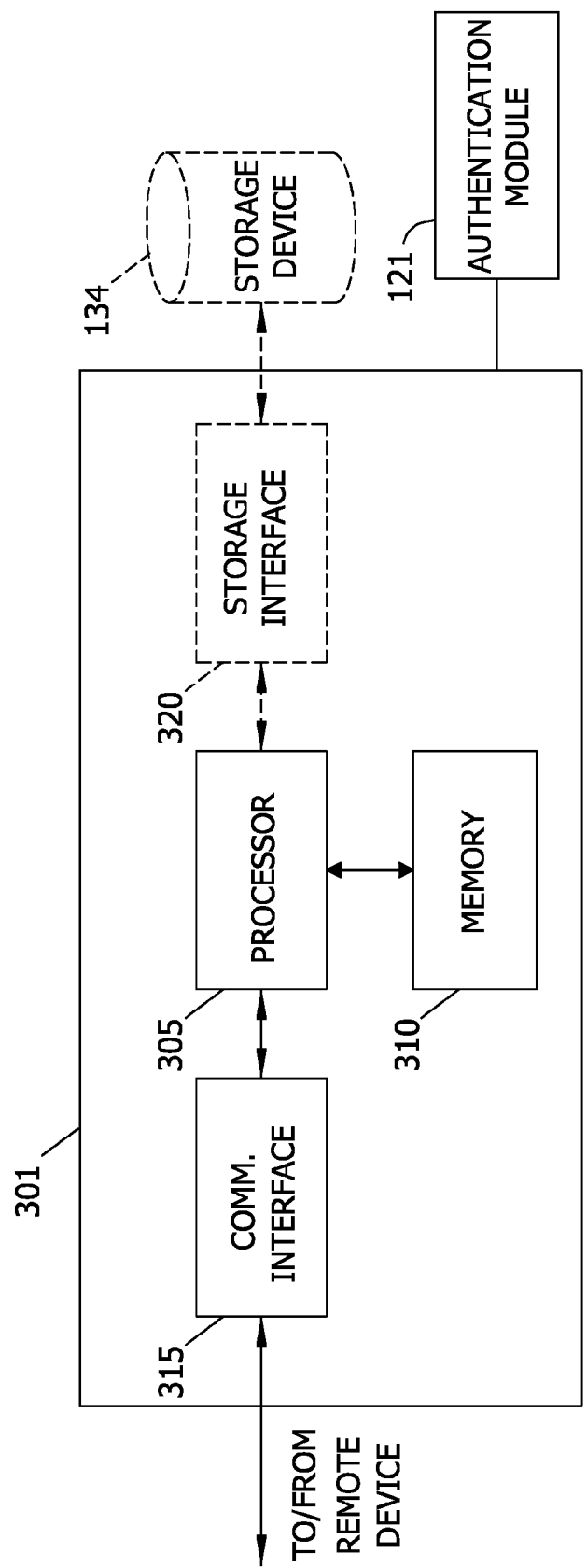

FIG. 5 illustrates an example configuration of a server system 301 such as server system 112 (shown in FIGS. 2 and 3). Server system 301 may include, but is not limited to, database server 116, application server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Server system 301 may be communicatively coupled to authenticating computing device 121. Authenticating computing device 121 enables server system 301 to offer authentication services, including services to confirm the user accessing information from host computing device 118 (shown in FIG. 2) is a human being. In the example embodiment, authenticating computing device 121 may be external to server system 301 and may be accessed by multiple server systems 301. For example, authenticating computing device 121 may be a stand-alone computing device coupled to a memory unit. In some embodiments, authenticating computing device 121 may be integrated with server system 301. For example, authenticating computing device 121 may be a specifically programmed section of server system 301 configured to perform the functions described herein when executed by processor 305.

Processor 305 is operatively coupled to a communication interface 315 such that server system 301 is capable of communicating with a remote device such as a user system or another server system 301. For example, communication interface 315 may receive requests from client system 114 and host computing device 118 via the Internet, as illustrated in FIGS. 2 and 3.

Processor 305 may be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
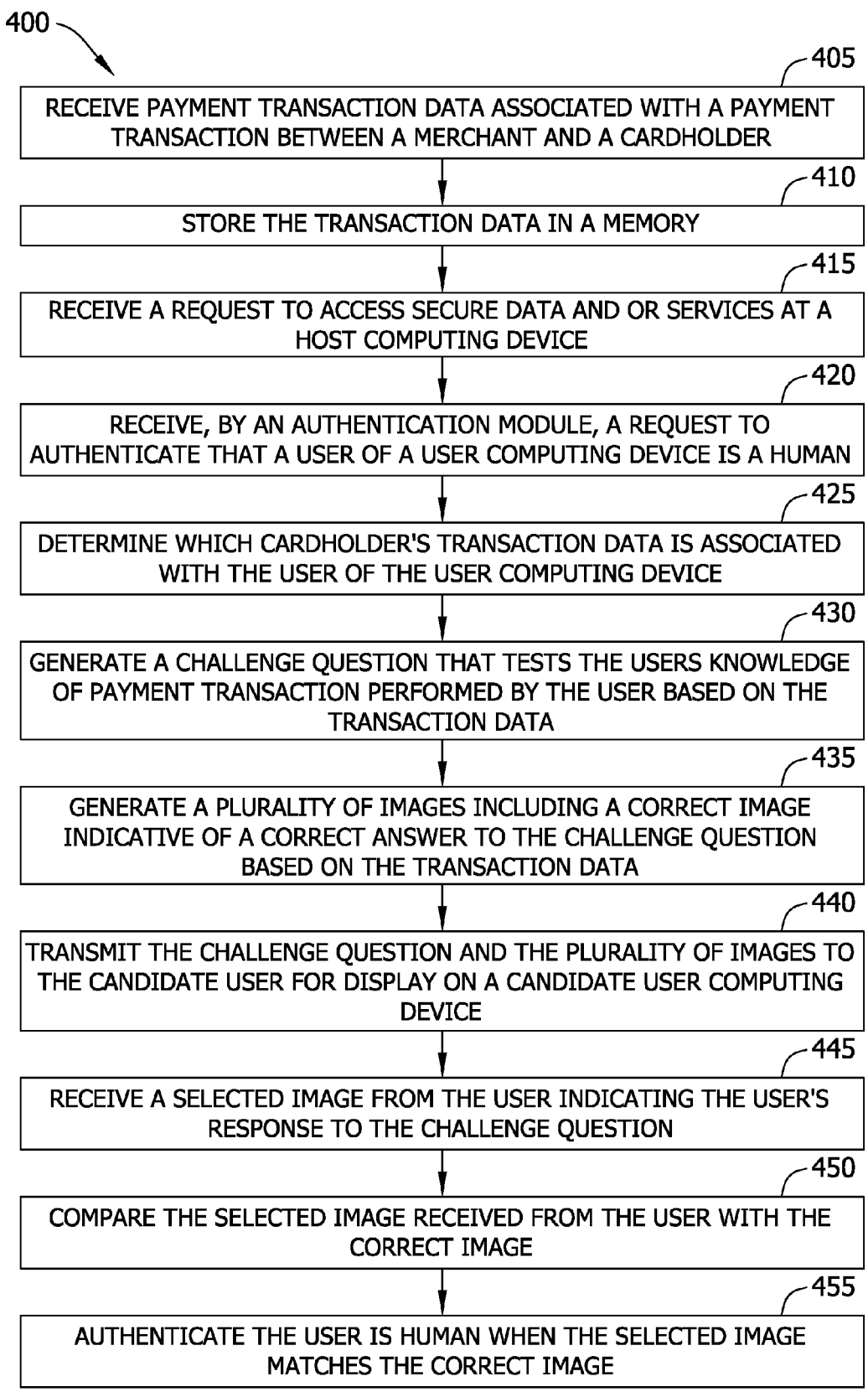

FIG. 6 is a simplified flowchart illustrating an example process 400 implemented by authenticating computing device 121 (shown in FIG. 2) to authenticate a user of a user computing device is a human being and not an automated machine. The user is attempting to access secure data and/or services on host computing device 118 (shown in FIG. 2). The authentication is based on transaction data generated by payment sub-system 102 (shown in FIG. 2). More specifically, authenticating computing device 121 receives 405 a request to authenticate a user as a human being from host computing device 118, for example, when the user requests access to secure data (e.g., bank statements, e-mail accounts, and/or online profiles) stored on host computing device 118 (shown in FIG. 2). The authentication request may include a user identifier, such as a name, an account number, or any other user identifier that identifies the user requesting access from host computing device 118. In another implementation, authenticating computing device 121 receives a computer identifier that identifies user computing device 117, such as the MAC and/or IP address of user computing device 117. Authenticating computing device 121 determines and associates 410 a particular payment card account with the user based on the received identifier. For example, the received identifier may be compared with predefined identifiers associated with each payment card account, such as names, account numbers, MAC addresses, etc.

Authenticating computing device 121 also retrieves 415 transaction data associated with payment transactions performed using the payment card associated with the particular payment card account. The transaction data includes data indicative of at least one of a merchant with whom a payment transaction was performed, a time period during which the each payment transaction was performed, the amount of a particular payment transaction, and a product associated with a particular payment transaction.

Also, in the example embodiment, authenticating computing device 121 generates 420 a challenge question based on the transaction data. The challenge question tests the user's knowledge of previous payment transactions performed with the payment card. The challenge question may test the time a particular payment transaction occurred, the product purchased in a payment transaction, a particular merchant associated with a payment transaction, a payment amount associated with a particular payment transaction, and/or any other question generated based on the transaction data. For example, the challenge question may ask "Which restaurant did you frequent and perform a payment transaction with last night?," What product did you purchase from a particular merchant with your payment card?," or "When was the last time you went to a particular merchant and performed a payment transaction?." In some embodiments, authenticating computing device 121 may generate a plurality of challenge questions based on the transaction data.

Authenticating computing device 121 also generates 425 a plurality of images including a correct image and at least one incorrect image for the challenge question. The correct image is a trademark, logo, brand name, or other image that represents an answer indicated as being true based on the transaction data associated with the particular payment card account. For example, if the challenge question is "Which restaurant did you frequent and perform a payment transaction with last night?," the correct answer is the particular restaurant which the transaction data indicates the cardholder frequented the previous night, and the correct image may be an image representative of that particular restaurant. The at least one incorrect image may be any other image that does not represent the correct answer. In particular, the at least one incorrect image may identify at least one of a product and a merchant that is not associated with any payment transaction performed with the payment card. The at least one incorrect image may be selected to represent similar merchants and/or similar products as the correct image. Alternatively, the at least one incorrect image may be selected to represent dissimilar products and/or dissimilar merchants as the correct image.

In the example embodiment, authenticating computing device 121 generates 420, 425 the challenge question and the plurality of images in response to the authentication request. In other embodiments, authenticating computing device 121 generates 420 the challenge question before receiving the authentication request and generates 425 the plurality of images in response to receiving the authentication request. Alternatively, the challenge question and the plurality of images are generated 420, 425 before authenticating computing device 121 receives the authentication request. Authenticating computing device 121 may store the generated challenge questions, the correct answers, and the plurality of images in memory, such as database 120. Alternatively, authenticating computing device 121 may transmit the generated challenge questions, correct answers, and plurality of images to host computing device 118 for storage.

Authenticating computing device 121 may also generate 420, 425 the challenge question and/or the plurality of images based on transaction data from a predefined period of time, such as the last day, the last week, the last month, or any other preset time period. In such an implementation, only transaction data from the preset time period is utilized in generating the challenge question and the plurality of images.

Authenticating computing device 121 transmits 430 the challenge question to the user for display on user computing device 117. Authenticating computing device 121 transmits 435 the plurality of images for display on user computing device 117. Authenticating computing device 121 may transmit the challenge question and the plurality of images directly to user computing device 117. Alternatively, authenticating computing device 121 may transmit the challenge question and the plurality of images to the user through host computing device 118. For example, the challenge question and plurality of images may be displayed on a website or portal associated with host computing device 118.

In the example embodiment, authenticating computing device 121 receives 440 the user's answer to the challenge question, for example a selected image, from user computing device 117, and compares 445 the user's answer with the correct image. Authenticating computing device 121 authenticates 450 the user is a human being when the correct image and the user's answer match. In other implementations authenticating computing device 121 provides the correct image to host computing device 118. In such an implementation, host computing device 118 compares the user's answer with the correct answer and authenticates the user as human.

Figure 7:
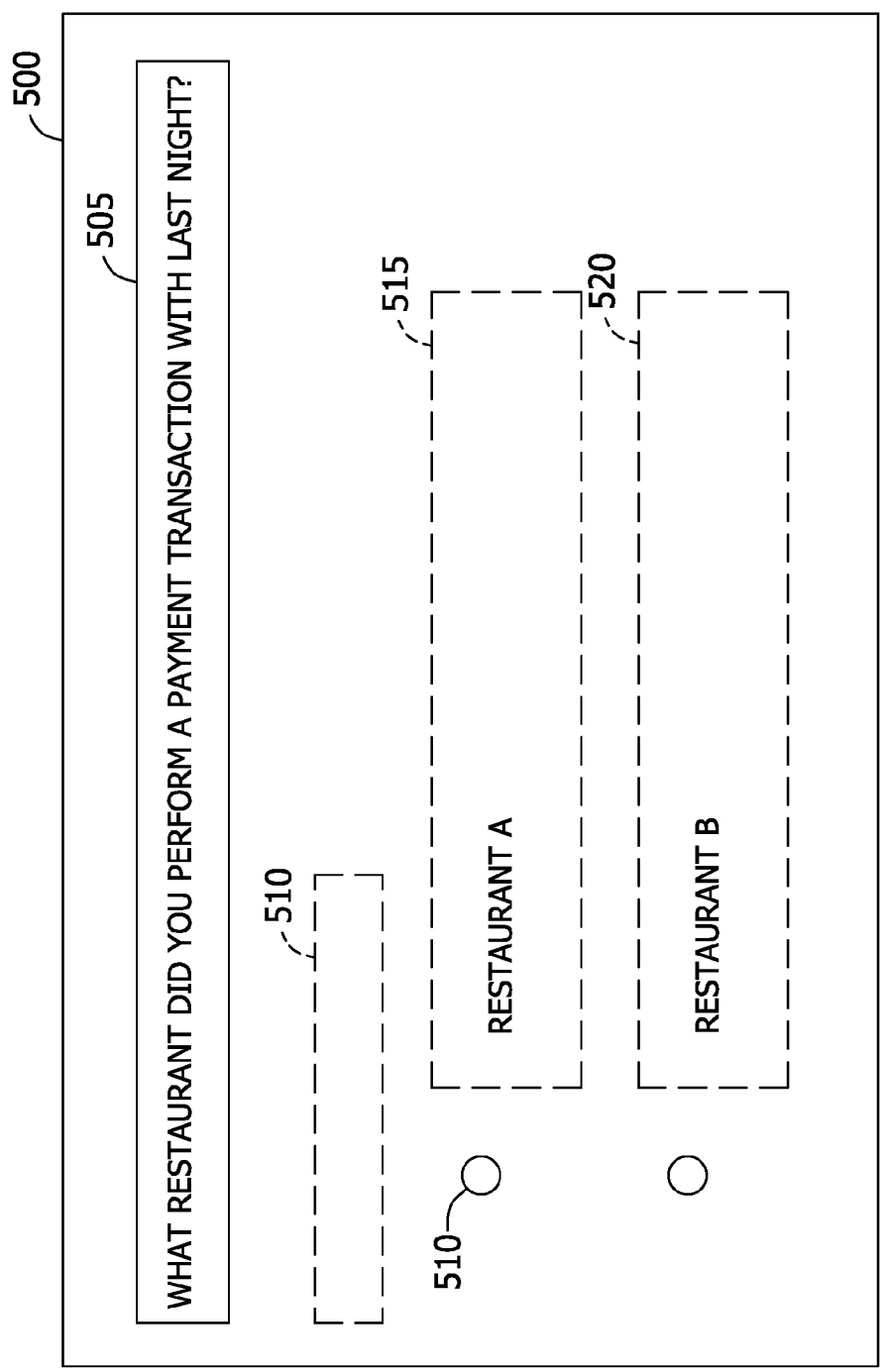

FIG. 7 is an example user interface 500 of user computing device 117 (shown in FIG. 2) displaying a challenge question generated by authenticating computing device 121 (shown in FIG. 2) for use in authenticating a user of user computing device 117 as a human being. User interface 500 may be generated for display by a website or portal associated with at least one of host computing device 118 and authenticating computing device 121.

In the example embodiment, user interface 500 includes at least one challenge question 505 that tests the user's knowledge of payment transactions performed with by a payment card account. User interface 500 also includes at least one data entry device 510 through which user responds to the challenge question. More specifically, data entry device 510 enables the user to select at least one of a correct image 515 and an incorrect image 520.

Data entry device 510 may be, for example, a text box through which the user enters a textual response to challenge question 505, e.g., the name of a particular merchant shown in the image. Data entry device 510 may also be, for example, an interactive element that can be selected or unselected to indicate an answer. Alternatively, data entry device 510 may be any device that enables the user to respond to challenge question 505.

Figure 8:
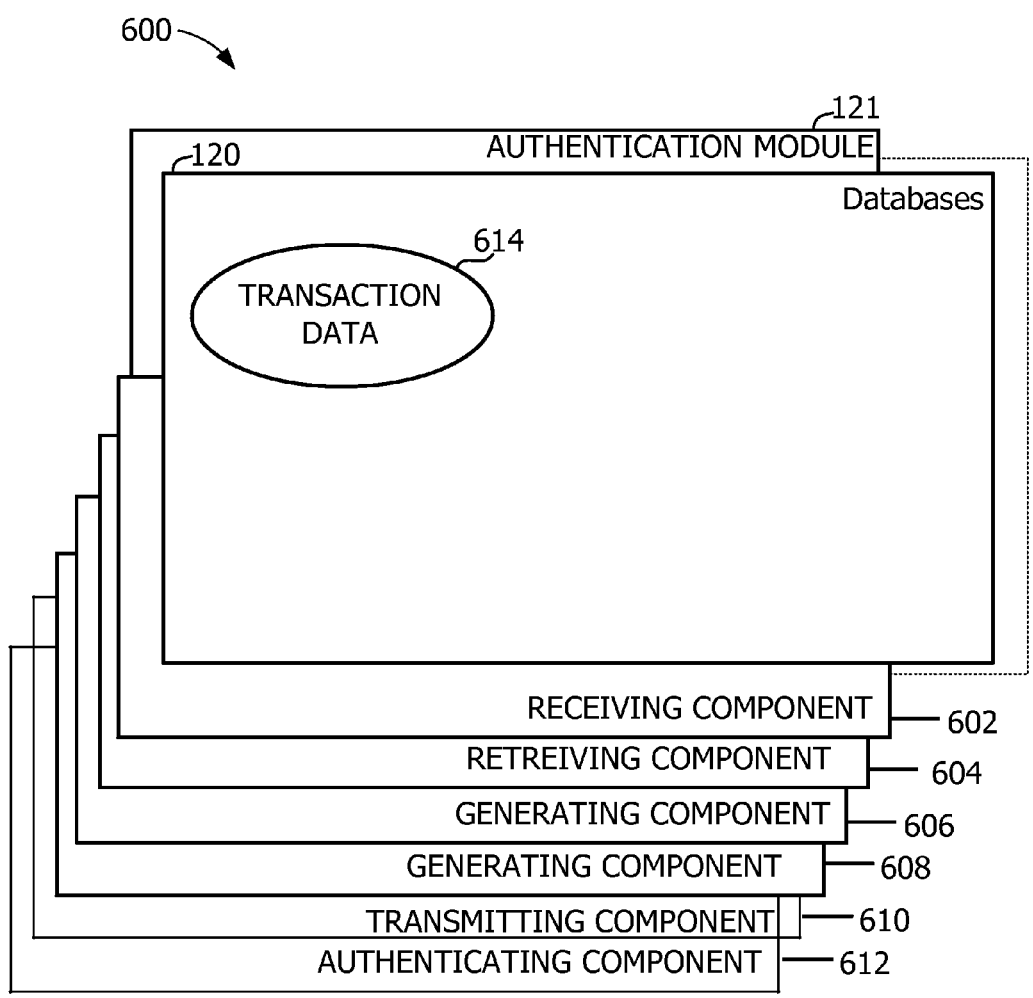

FIG. 8 is a diagram of a component layout of a computing device as shown in FIGS. 2-3. For example, one or more of computing devices may form authenticating computing device 121. FIG. 8 further shows a configuration of database 120. Database 120 is coupled to several separate components within authenticating computing device 121, which perform specific tasks.

Authenticating computing device 121 includes a receiving component 602 for receiving a request to authenticate a user of a user computing device 117 (shown in FIG. 2) as a human being. Authenticating computing device 121 also includes a retrieving component 604 for retrieving transaction data for at least one of the user and user computing device 117 that is associated with a payment card account used in performing payment transactions between a cardholder and a merchant. Authenticating computing device 121 also includes a generating component 606 that generates challenge question 505 (shown in FIG. 7). Authenticating computing device 121 also includes a generating component 608 that generates a plurality of images including correct image 515 (shown in FIG. 7) and incorrect images 520 (shown in FIG. 7). Authenticating computing device 121 also includes a transmitting component 610 for transmitting challenge question 505, correct image 515, and incorrect image 520 for display on user computing device 117. Authenticating computing device 121 may also include an authenticating component 612 that authenticates that the user of user computing device 117 as a human being and not an automated machine when the user responds to the challenge question correctly, e.g., by selecting the correct image.

In an example embodiment, database 120 includes, but is not limited to, a transaction data section 614. Transaction data section 614 includes transaction data associated with a plurality of payment transactions performed by a plurality of payment card accounts.

The above-described embodiments provide a method and system of using transaction data to authenticate a user attempting to access a host computing device as a human being. By authenticating a user is human, the systems and methods described herein facilitate preventing automated machines from accessing secure data and/or services. Specifically, automated systems have no knowledge of transactions associated with the particular cardholder, and improvements in computer technology will not improve the performance of automated systems in this area. Accordingly, fewer automated systems are granted access to host computing devices. In addition, the use of transaction data associated with the payment card account of the user allows for secure authentication without the use of complicated or difficult to understand images.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 212, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for (a) receiving, by the authenticating computing device, a request to authenticate the user of the user computing device as a human being, wherein the request includes an identifier associated with at least one of the user and the user computing device; (b) retrieving, by the authenticating computing device, transaction data for a payment card account that is associated with the user based on the identifier; (c) generating, by an authenticating computing device, a challenge question based on the transaction data; (d) generating, by the authenticating computing device, a plurality of images based on the transaction data, wherein at least one of the plurality of images is a correct image indicative of a correct answer to the challenge question, and at least one of the plurality of images is an incorrect image that is indicative of an incorrect answer to the challenge question; and (e) transmitting the challenge question and the plurality of images for display on the user computing device.

Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media are tangible and non-transitory and store information such as computer readable instructions, data structures, program modules, or other data. Communication media, in contrast, typically embody computer readable instructions, data structures, program modules, or other data in a transitory modulated data signal such as a carrier wave or other transport mechanism and include any information delivery media. Combinations of any of the above are also included within the scope of computer readable media.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for authenticating a user of a user computing device as a human being and not an automated machine, wherein the user is attempting to access a host computing device, the host computing device in communication with an authenticating computing device, said method comprising:

registering the user computing device with the authenticating computing device, using an identifier associated with at least one of the user and the user computing device;

receiving, by the authenticating computing device, a request to authenticate the user of the user computing device as a human being, wherein the request includes the identifier;

retrieving, by the authenticating computing device, transaction data using the identifier for a payment card account that is associated with the user, the transaction data including an identifier of a merchant through which at least one previous transaction associated with the transaction data was made;

generating, by the authenticating computing device, a challenge question based on the merchant identifier in the transaction data, wherein the transaction data includes at least one previous transaction, and wherein the challenge question includes identifying a merchant associated with the at least one previous transaction, the challenge question being generated before receiving the request to authenticate the user as human, the plurality of images being generated after receiving the request to authenticate the user as human being;

generating, by the authenticating computing device, a challenge image associated with the challenge question, wherein the challenge image represents an image of the merchant associated with the at least one previous transaction, the challenge image including at least one of a trademark of the merchant, a logo of the merchant, a brand name of the merchant, an image of a physical aspect of the merchant, and combinations thereof;

generating, by the authenticating computing device and based in part on the challenge image, a set of images representing images of merchants that are not associated with the at least one previous transaction;

transmitting the challenge question and a plurality of images for display on the user computing device, wherein the plurality of images displayed includes the challenge image and the set of images;

receiving, by the authenticating computing device, an image selection from the user computing device in response to the challenge question;

determining that the image selection matches the challenge image; and transmitting an authentication message to the host computing device, wherein the authentication message represents that the user is a human being.

2. The method of claim 1 wherein retrieving the transaction data further comprises:
performing a lookup for the transaction data within a transaction database using the identifier.

3. The method of claim 1, further comprising transmitting, by the authenticating computing device, the challenge question and the plurality of images to the host computing device, which causes the challenge question and the plurality of images to be displayed on the user computing device.

4. The method of claim 1, wherein retrieving the transaction data includes retrieving data associated with at least one transaction data category, wherein the transaction data category includes a time a particular payment transaction occurred, a product purchased in a particular payment transaction, a particular merchant associated with a payment transaction, a payment amount associated with a particular payment transaction.

5. The method of claim 1, wherein generating the challenge question and the plurality of images is based on transaction data from a predefined period of time.

6. The method of claim 1, wherein registering the user computing device further comprises:
receiving at least one of (i) a user identifier including at least one of a primary account number of a payment card account and a username entered by the user, and (ii) a user computing device identifier including at least one of a media access control (MAC) address of the user computing device, and an IP address of the user computing device;
storing the user computing device identifier; and
associating the user computing device with a payment account identifier for the payment card account of the user.

7. The method of claim 1, wherein generating the plurality of images includes generating at least one image that is not associated with the at least one previous transaction.

8. The method of claim 1, further comprising generating descriptive text associated with each of the plurality of images and transmitting the descriptive text to the user computing device for display.

9. An authenticating computing device for authenticating a user of a user computing device as a human being and not an automated machine, wherein the user is attempting to access a host computing device, said authenticating computing device comprising a memory and a processor coupled to the memory, said processor configured to:
register the user computing device with the authenticating computing device using an identifier associated with at least one of the user and the user computing device;
receive a request to authenticate the user as human, wherein the request includes the identifier;
retrieve transaction data using the identifier for a payment card account that is associated with the user, the transaction data including an identifier of a merchant through which at least one previous transaction associated with the transaction data was made;
generate a challenge question based on the merchant identifier in the transaction data, wherein the transaction data includes at least one previous transaction, and wherein the challenge question includes identifying a merchant associated with the at least one previous transaction, the challenge question being generated before receiving the request to authenticate the user as human, the plurality of images being generated after receiving the request to authenticate the user as human being;
generate a challenge image associated with the challenge question, wherein the challenge image represents an image of the merchant associated with the at least one previous transaction, the challenge image including at least one of a trademark of the merchant, a logo of the merchant, a brand name of the merchant, an image of a physical aspect of the merchant, and combinations thereof;
generate, based in part on the challenge image, a set of images representing images of merchants that are not associated with the at least one previous transaction;
transmit the challenge question and a plurality of images for display on the user computing device, wherein the plurality of images displayed includes the challenge image and the set of images;
receive an image selection from the user computing device in response to the challenge question;
determine that the image selection matches the challenge image; and
transmit an authentication message to the host computing device, wherein the authentication message represents that the user is a human being.

10. The authenticating computing device of claim 9, wherein, to retrieve the transaction data, the processor is further configured to:
perform a lookup for the transaction data within a transaction database using the identifier.

11. The authenticating computing device of claim 9, wherein the processor is further configured to transmit the challenge question and the plurality of images to the host computing device, which causes the challenge question and the plurality of images to be displayed to the user computing device.

12. The authenticating computing device of claim 9, wherein the transaction data includes data associated with at least one transaction data category, wherein the transaction data category includes a time a particular payment transaction occurred, a product purchased in a particular payment transaction, a particular merchant associated with a particular payment transaction, and a payment amount associated with a particular payment transaction.

13. The authenticating computing device of claim 9, wherein the challenge question and the plurality of images are generated based on transaction data from a predefined period of time.

14. The authenticating computing device of claim 9, wherein the identifier includes a user identifier that is at least one of a primary account number of a payment card account and a username entered by the user, and wherein registering the user computing device further comprises:
receiving a user computing device identifier for the user computing device, wherein the user computing device identifier includes at least one of a MAC address of the user computing device, and an IP address of the user computing device;
storing the user computing device identifier; and
associating the user computing device with a payment account identifier for the payment card account of the user.

15. The authenticating computing device of claim 9, wherein at least one image of the plurality of images identifies at least one of a product and a merchant that is not associated with the at least one previous transaction.

16. A non-transitory computer readable storage medium having computer-executable instructions for authenticating a user of a user computing device as a human being, wherein the user is attempting to access a host computing device, and wherein, when executed by at least one processor, the computer-executable instructions cause the at least one processor to:
- register the user computing device with the authenticating computing device, using an identifier associated with at least one of the user and the user computing device;
- receive a request to authenticate the user as human, wherein the request includes the identifier;
- retrieve transaction data using the identifier for a payment card account that is associated with the user, the transaction data including an identifier of a merchant through which at least one previous transaction associated with the transaction data was made;
- generate a challenge question based on the merchant identifier in the transaction data, wherein the transaction data includes at least one previous transaction, and wherein the challenge question includes identifying a merchant associated with the at least one previous transaction, the challenge question being generated before receiving the request to authenticate the user as human, the plurality of images being generated after receiving the request to authenticate the user as a human being;
- generate a challenge image associated with the challenge question, wherein the challenge image represents an image of a merchant associated with the at least one previous transaction, the challenge image including at least one of a trademark of the merchant, a logo of the merchant, a brand name of the merchant, an image of a physical aspect of the merchant, and combinations thereof;
- generate, based in part on the challenge image, a set of images representing images of merchants that are not associated with the at least one previous transaction;
- transmit the challenge question and a plurality of images for display on the user computing device, wherein the plurality of images displayed includes the challenge image and the set of images;
- receive an image selection from the user computing device in response to the challenge question;
- determine that the image selection matches the challenge image; and
- transmit an authentication message to the host computing device, wherein the authentication message represents that the user is a human being.

17. The non-transitory computer readable medium of claim 16, wherein, to retrieve the transaction data, the computer-executable instructions further cause the processor to:
- perform a lookup for the transaction data within a transaction database using the identifier.

18. The non-transitory computer readable medium of claim 16, wherein the computer-executable instructions further cause the processor to transmit the challenge question and the plurality of images to a host computing device, which causes the challenge question to be displayed on the user computing device.

19. The non-transitory computer readable medium of claim 16, wherein at least one image of the plurality of images identifies at least one of a product and a merchant that is not associated with the at least one previous transaction.

* * * * *